US012588130B2

(12) United States Patent
Lu et al.

(10) Patent No.: US 12,588,130 B2
(45) Date of Patent: Mar. 24, 2026

(54) ILLUMINANCE CALIBRATION DEVICE AND METHOD THEREOF

(71) Applicant: Xiamen PVTECH Co., Ltd., Fujian (CN)

(72) Inventors: Fuxing Lu, Fujian (CN); Ronghui Wang, Fujian (CN)

(73) Assignee: Xiamen PVTECH Co., Ltd., Xiamen (CN)

(*) Notice: Subject to any disclaimer, the term of this patent is extended or adjusted under 35 U.S.C. 154(b) by 261 days.

(21) Appl. No.: 18/244,316

(22) Filed: Sep. 11, 2023

(65) Prior Publication Data

US 2024/0334576 A1 Oct. 3, 2024

(30) Foreign Application Priority Data

Mar. 27, 2023 (CN) ......................... 202310303031.3

(51) Int. Cl.
*H05B 47/19* (2020.01)
*H05B 47/11* (2020.01)
*H05B 47/165* (2020.01)

(52) U.S. Cl.
CPC ........... *H05B 47/19* (2020.01); *H05B 47/165* (2020.01); *H05B 47/11* (2020.01)

(58) Field of Classification Search
CPC ........ H05B 45/10; H05B 47/10; H05B 47/19; H05B 47/165; H05B 47/11
See application file for complete search history.

(56) References Cited

FOREIGN PATENT DOCUMENTS

| | | | | |
|---|---|---|---|---|
| CN | 108760042 A | * 11/2018 | ................ | G01J 1/00 |
| CN | 114051300 A | 2/2022 | | |

* cited by examiner

*Primary Examiner* — Monica C King
(74) *Attorney, Agent, or Firm* — Bruce Stone LLP; Joseph A. Bruce

(57) ABSTRACT

An illuminance calibration device includes a processing module and a light detecting module. The processing module executes an illuminance calibration process. The light detecting module detects the current illuminance of a target position and transmits the current illuminance to the processing module. When the processing module is executing the illuminance calibration process, the processing module transmits a test signal to a lighting device to adjust the brightness of the lighting device by the minimal brightness adjusting unit of the lighting device so as to obtain the adjusted current illuminance of the target position. Then, the processing module generates a brightness adjusting signal according to the current illuminance, the adjusted current illuminance, the minimal brightness adjusting unit and a target illuminance in order to adjust the brightness of the lighting device, such that the illuminance of the target position reaches the target illuminance.

1 Claim, 5 Drawing Sheets

ILLUMINANCE CALIBRATION DEVICE AND METHOD THEREOF

BACKGROUND OF THE INVENTION

1. Field of the Invention

The present invention relates to an illuminance calibration device, in particular to an illuminance calibration device capable of performing illumination calibration for a target position. The present invention further relates to the illuminance calibration method of this device.

2. Description of the Prior Art

Due to advance of technology, the requirements of lighting devices gradually become higher. Some applications need to keep constant illuminance. In other words, the brightness of the lighting device needs to remain unchanged or reach a specified brightness. However, most of the lighting devices can only adjust the brightness of the light sources thereof, but there is no method capable of directly adjusting the illuminance of a target position. Accordingly, the currently available lighting devices cannot satisfy the actual requirements and cannot provide great user experience.

For the same reason, the power consumption of the currently available lighting devices cannot be effectively decreased, so cannot be energy-saving.

China Patent Publication No. CN105430808, China Patent Publication No. CN114401568, and US Patent Publication No. US20170118816 disclose several illuminance adjustment technologies for lighting devices, but still cannot effectively solve the above-mentioned problems.

SUMMARY OF THE INVENTION

One embodiment of the present invention provides an illuminance calibration device, which includes a processing module and a light detecting module. The processing module executes an illuminance calibration process. The light detecting module detects the current illuminance of a target position and transmits the current illuminance to the processing module. When the processing module is executing the illuminance calibration process, the processing module transmits a test signal to a lighting device to adjust the brightness of the lighting device by the minimal brightness adjusting unit of the lighting device so as to obtain the adjusted current illuminance of the target position. Then, the processing module generates a brightness adjusting signal according to the current illuminance, the adjusted current illuminance, the minimal brightness adjusting unit and a target illuminance in order to adjust the brightness of the lighting device, such that the illuminance of the target position reaches the target illuminance.

In one embodiment of the present invention, when the processing module is executing the illuminance calibration process, the processing module deducts the current illuminance from the adjusted current illuminance to obtain a brightness-illuminance relation parameter, and deduct the current illuminance from the target illuminance to obtain a first calibration result. The processing module multiplies the first calculation result by the minimal brightness adjusting unit to obtain a second calculation result, and divides the second calculation result by the brightness-illuminance relation parameter to obtain a third calculation result in order to serve as the target brightness of the lighting device.

In one embodiment of the present invention, the processing module generates the brightness adjusting signal according to the target brightness and the minimal brightness adjusting unit.

In one embodiment of the present invention, the light source of the lighting device is a light-emitting diode (LED), a LED array, a fluorescent lamp, a bulb or other similar components.

In one embodiment of the present invention, the processing module is a microcontroller unit, a central-processing unit, an application specific integrated circuit or a field programmable gate array.

Another embodiment of the present invention provides an illuminance calibration method, which includes the following steps: detecting the current illuminance of the target position; transmitting a test signal to a lighting device to adjust the brightness of the lighting device by the minimal brightness adjusting unit of the lighting device so as to obtain the adjusted current illuminance of the target position; generating a brightness adjusting signal according to the current illuminance, the adjusted current illuminance, the minimal brightness adjusting unit and a target illuminance; and adjusting the brightness of the lighting device by the brightness adjusting signal in order to make the illuminance of the target position reaches the target illuminance.

In one embodiment of the present invention, the step of generating the brightness adjusting signal according to the current illuminance, the adjusted current illuminance, the minimal brightness adjusting unit and the target illuminance includes the following steps: deducting the current illuminance from the adjusted current illuminance to obtain a brightness-illuminance relation parameter; deducting the current illuminance from the target illuminance to obtain a first calculation result; multiplying the first calculation result by the minimal brightness adjusting unit to obtain a second calculation result; and dividing the second calculation result by the brightness-illuminance relation parameter to obtain a third calculation result in order to serve as the target brightness of the lighting device.

In one embodiment of the present invention, the step of generating the brightness adjusting signal according to the current illuminance, the adjusted current illuminance, the minimal brightness adjusting unit and the target illuminance further includes the following step: generating the brightness adjusting signal according to the target brightness and the minimal brightness adjusting unit.

In one embodiment of the present invention, the light source of the lighting device is a light-emitting diode (LED), a LED array or other similar components.

In one embodiment of the present invention, the light source of the lighting device is a fluorescent lamp, a bulb or other similar components.

The illuminance calibration device and the method thereof in accordance with the embodiments of the present invention may have the following advantages:

(1) In one embodiment of the present invention, the illuminance calibration device includes a processing module and a light detecting m processing module performs an illuminance calibration process. The processing module performs an illuminance calibration process. The light detecting module detects the current illuminance of a target position and transmits the current illuminance to the processing module. When the processing module is executing the illuminance calibration process, the processing module transmits a test signal to the lighting device in order to adjust the brightness of the lighting device by the minimal brightness adjusting unit of the lighting device and obtain the adjusted current illuminance of the target position. Afterward, the processing module can generate a brightness adjusting signal according to the current illuminance, the adjusted current illuminance, the minimal brightness adjusting unit and a target illuminance so as to adjust the brightness of the lighting device, such that the illuminance of the lighting device can reach the target illuminance. The above illuminance calibration process can be directly used to adjust the illuminance of a specific position. Therefore, the illuminance calibration device can conform to actual requirements and provide greater user experience.

(2) In one embodiment of the present invention, the illuminance calibration device has a specially-designed illuminance calibration process and this illuminance calibration process can be easily realized by executing an application via the processing module of the illuminance calibration device without additional calibration instruments. Accordingly, the cost of realizing the illuminance calibration function can be reduced, so the illuminance calibration device can be more comprehensive in application.

(3) In one embodiment of the present invention, the illuminance calibration device has the specially-designed illuminance calibration process, which can effectively calculate a brightness-illuminance relation parameter with a view to precisely obtaining the relation between the brightness of the lighting device and the illuminance of the target position. Th above mechanism can greatly simplify the illuminance calibration process and can achieve precise illuminance calibration result. Thus, the brightness adjustment of the lighting deice can be more accurate so as to reduce the power consumption of the lighting device, such that the lighting device can save more energy. In this way, the illuminance calibration device can satisfy actual requirements and meet the future development trend.

(4) In one embodiment of the present invention, the function of the illuminance calibration device can perform the illuminance calibration process by integrating a mobile device and the application corresponding thereto. The mobile device may be a smart phone, a smart watch, a tablet computer, a laptop computer or other similar devices. Therefore, the illuminance calibration device can be more convenient and flexible in use.

(5) In one embodiment of the present invention, the design of the illuminance calibration device is simple, so the illuminance calibration device can achieve great technical effects without significantly increasing the cost thereof. As a result, the illuminance calibration device can have high commercial value.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following d detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
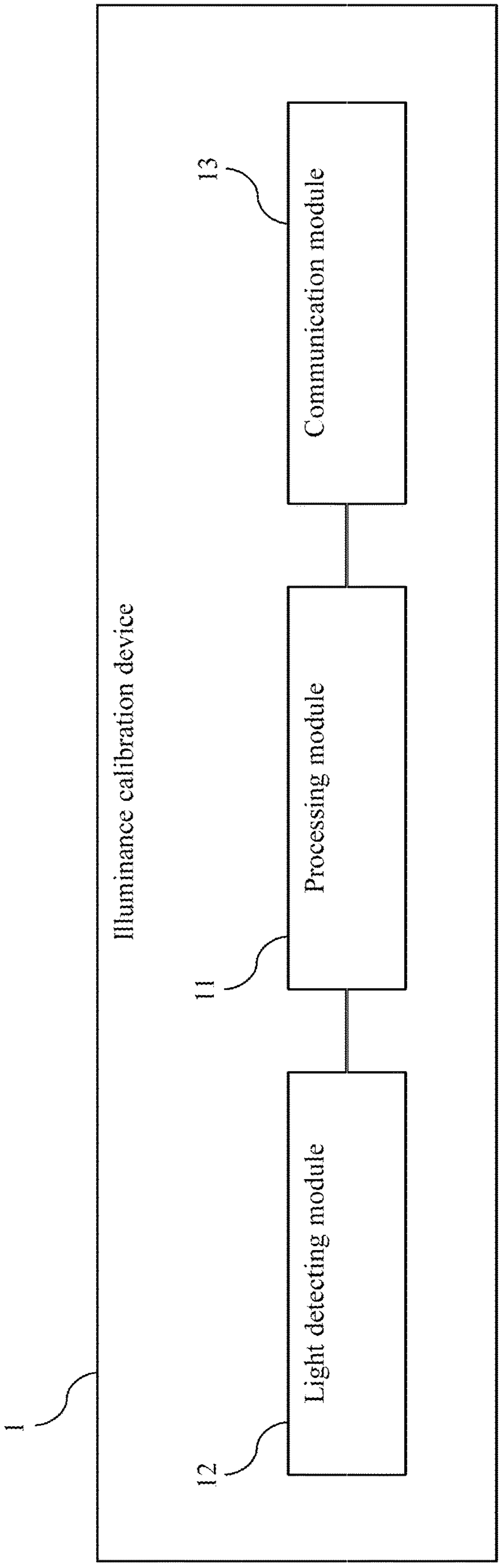
FIG. 1 is a block diagram of an illuminance calibration device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is “coupled” or “connected” to another element, the element may be “directly coupled” or “directly connected” to the other element or “coupled” or “connected” to the other element through a third element. In contrast, it should be understood that, when it is described that an element is “directly coupled” or “directly connected” to another element, there are no intervening elements.

Please refer to FIG. 1, which is a block diagram of an illuminance calibration device in accordance with one embodiment of the present invention. As shown in FIG. 1, the illuminance calibration device 1 includes a processing module 11, a light detecting module 12 and a communication module 13. The illuminance calibration device 1 may be a mobile device capable of executing an application, such as a smart phone, a smart watch, a tablet computer, a laptop computer, etc.

The processing module 11 can execute an illuminance calibration process. In one embodiment, the processing module 11 may be a microcontroller unit (MCU), a central-processing unit (CPU), an application specific integrated circuit (ASIC), a field programmable gate array (FPGA) or other similar components. In another embodiment, the processing module 11 may also be a software module, which can execute the illumination calibration process according to the software program.

The light detecting module 12 is connected to the processing module 11. In one embodiment, the light detecting module 12 may be an ambient light sensor, an illuminance sensor or other similar components. In another embodiment, the light detecting module 12 may also be a software module, which can perform calculation according to the signal received from a light sensor in order to obtain the current illuminance.

The communication module 13 is connected to the communication module 11. In one embodiment, the communication module 13 may be a Bluetooth communication module, a WIFI communication module, a ZigBee communication module or other similar components.

The embodiment just exemplifies the present invention and is not intended to limit the scope of the present invention; any equivalent modification and variation according to the spirit of the present invention is to be also included within the scope of the following claims and their equivalents.

Figure 2:
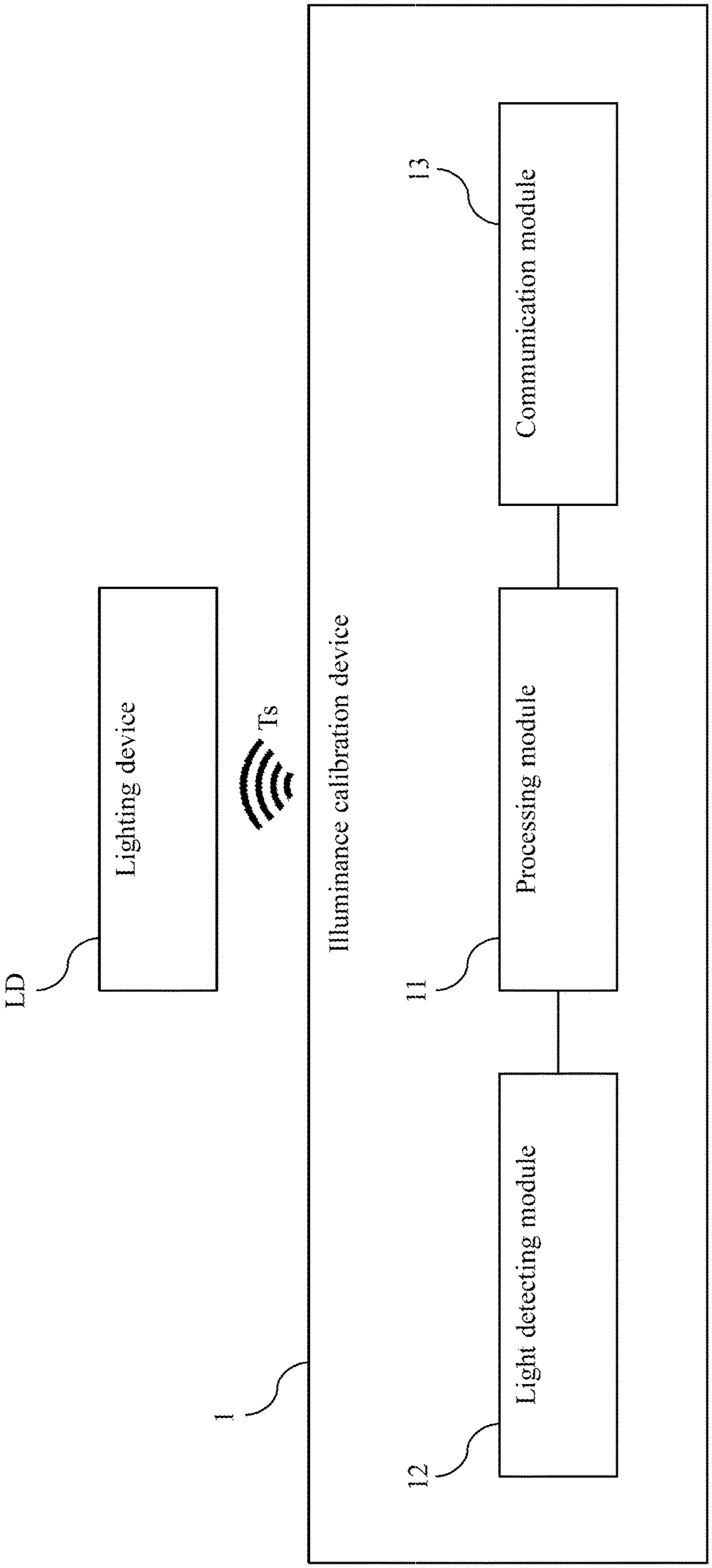
FIG. 2 is a first schematic view of the illuminance calibration device in an operating state in accordance with one embodiment of the present invention.

Please refer to FIG. 2, which is a first schematic view of the illuminance calibration device in an operating state in accordance with one embodiment of the present invention. As shown in FIG. 2, when a user wants to adjust the illuminance of a target position, the user can operate the illuminance calibration device 1 to set a target illuminance and put the illuminance calibration device 1 at the target position. Then, the light detecting module 12 detects the current illuminance of the target position and then transmits the current illuminance to the processing module 11.

Afterward, the processing module 11 can perform the illuminance calibration process. When the processing module 11 is executing the illuminance calibration process, the processing module 11 transmits a test signal Ts to a lighting device LD corresponding to the target position via the communication module 13 in order to adjust the brightness of the lighting device LD by the minimal brightness adjusting unit. Then, the light detecting module 12 detects the adjusted current illuminance of the target position (after the brightness of the lighting device LD is adjusted via the minimal brightness adjusting unit thereof, the illuminance of the target position is changed), and transmits the adjusted current illuminance to the processing module 11. In this embodiment, the light source of the lighting device LD is a light-emitting diode (LED). In another embodiment, the light source of the lighting device LD may be a LED array, a fluorescent lamp, a bulb or other similar components.

Figure 3:
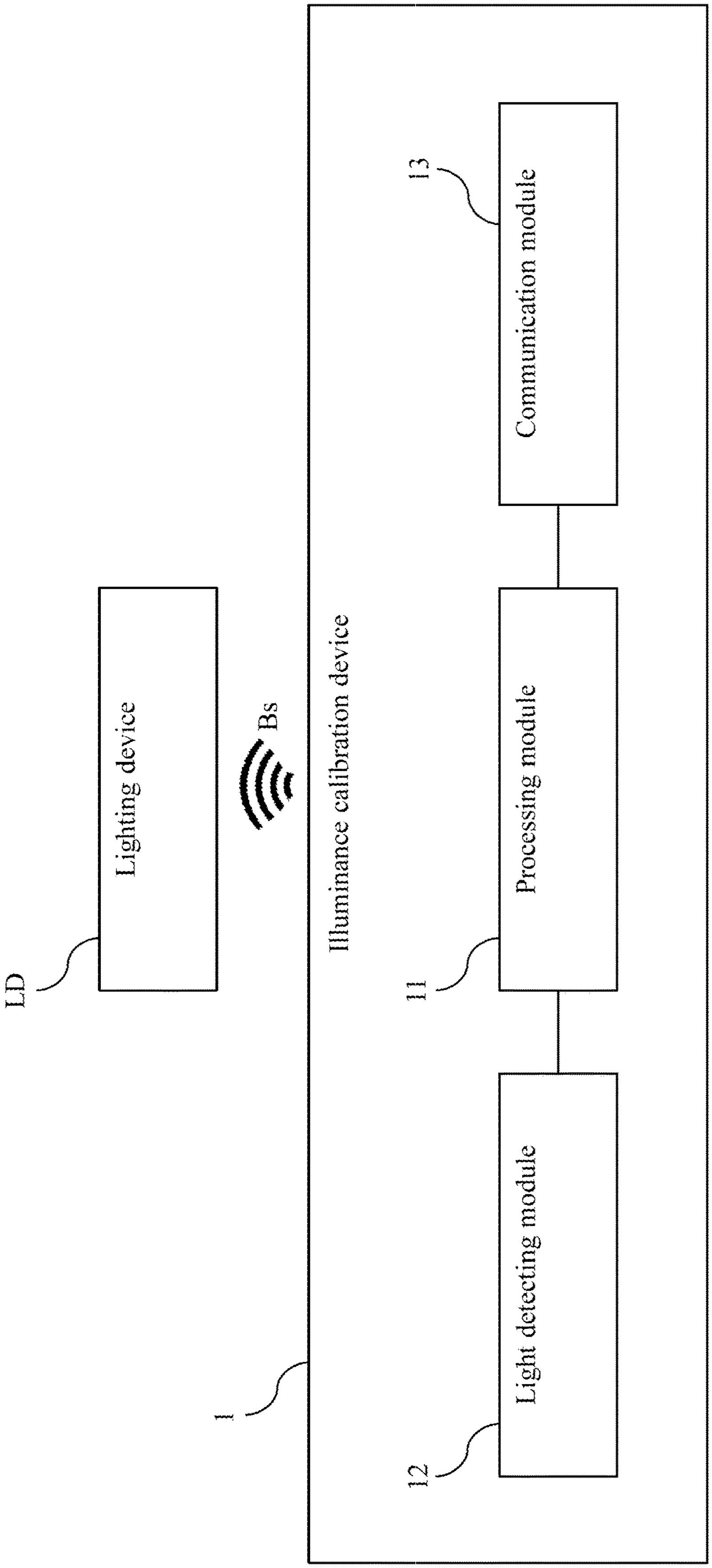
FIG. 3 is a second schematic view of the illuminance calibration device in the operating state in accordance with one embodiment of the present invention.

Please refer to FIG. 3, which is a second schematic view of the illuminance calibration device in the operating state in accordance with one embodiment of the present invention. As shown in FIG. 3, the processing module 11 can generate a brightness adjusting signal Bs according to the current illuminance, the adjusted current illuminance, the minimal brightness adjusting unit and a target illuminance. Afterward, the processing module 11 transmits the brightness adjusting signal Bs to the lighting device LD via the communication module 13 so as to adjust the brightness of the lighting device LD. In this way, the illuminance of the target position can reach the target illuminance.

When the processing module 11 is executing the illuminance calibration process, the processing module deducts the current illuminance from the adjusted current illuminance in order to obtain the brightness-illuminance relation parameter, as shown in Equation (1) given below:

$$b = M2 - M1 \tag{1}$$

In Equation (1), M1 stands for the current illuminance of the target position; M2 stands for the adjusted current illuminance; b stands for the brightness-illuminance relation parameter.

Next, the processing module 11 deducts the current illuminance of the target position from the target illuminance in order to obtain a first calculation result, and then multiplies the first calculation result by the minimal brightness adjusting unit so as to obtain a second calculation result. Then, the processing module 11 divides the second calculation result by the brightness-illuminance relation parameter to obtain a third calculation result in order to serve as the target brightness of the lighting device LD, as shown in Equation (2) given below:

$$c = a * (N - M1)/b \tag{2}$$

In Equation (2), N stands for the target illuminance set by the user; a stands for the minimal brightness adjusting unit of the lighting device LD; c stands for the target brightness of the lighting device LD. Therefore, the first calculation result is N−M1; the second calculation result is a*(N−M1); the third calculation result is c.

Finally, the processing module 11 generates the brightness adjusting signal Bs according to the target brightness and the minimal brightness adjusting unit, and then transmits the brightness adjusting signal Bs to the lighting device LD via the communication module 13 with a view to directly adjusting the brightness of the lighting device LD to the target brightness. In this way, the illuminance of the target position can reach the target illuminance.

The lighting device LD has a controller, a light source and a signal receiving module. The controller is connected to the light source and the signal receiving module. The lighting device LD can receive the brightness adjusting signal Bs via the signal receiving module, such that the controller can adjust the brightness of the light source to the target brightness according to the brightness adjusting signal Bs. In one embodiment, the controller may be a MCU, a CPU, an ASIC, a FPGA or other similar components.

As described above, the illuminance calibration device 1 includes the processing module 11 and the light detecting module 12 in order to execute the illuminance calibration process. The above illuminance calibration process can be directly used to adjust the illuminance of a specific position. Therefore, the illuminance calibration device 1 can conform to actual requirements and provide greater user experience.

In addition, the illuminance calibration device 1 has a specially-designed illuminance calibration process and this illuminance calibration process can be easily realized by executing an application via the processing module 11 of the illuminance calibration device 1 without additional calibration instruments. Accordingly, the cost of realizing the illuminance calibration function can be reduced, so the illuminance calibration device 1 can be more comprehensive in application.

Moreover, the illuminance calibration device 1 has the specially-designed illuminance calibration process, which can effectively calculate a brightness-illuminance relation parameter with a view to precisely obtaining the relation between the brightness of the lighting device LD and the illuminance of the target position. Th above mechanism can greatly simplify the illuminance calibration process and can achieve precise illuminance calibration result. Thus, the brightness adjustment of the lighting deice LD can be more accurate so as to reduce the power consumption of the lighting device LD, such that the lighting device LD can save more energy. In this way, the illuminance calibration device 1 can satisfy actual requirements and meet the future development trend.

The embodiment just exemplifies the present invention and is not intended to limit the scope of the present invention; any equivalent modification and variation according to the spirit of the present invention is to be also included within the scope of the following claims and their equivalents.

Figure 4:
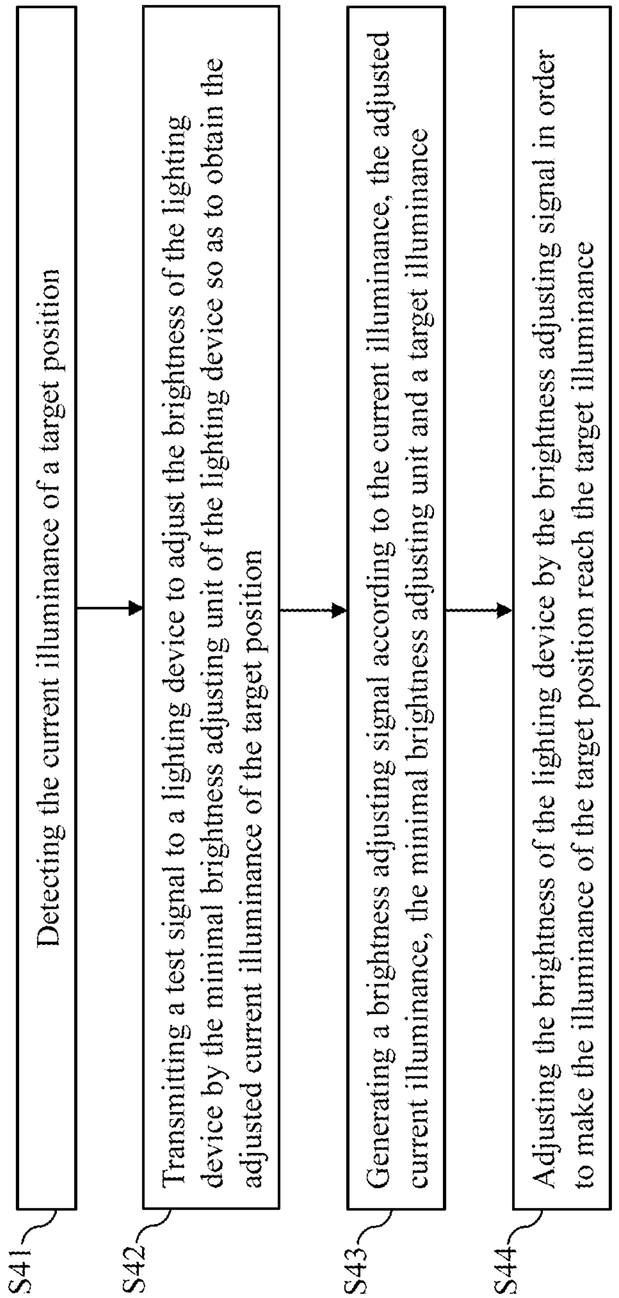
FIG. 4 is a flow diagram of an illuminance calibration method in accordance with one embodiment of the present invention.

Please refer to FIG. 4, which is a flow diagram of an illuminance calibration method in accordance with one embodiment of the present invention. As shown in FIG. 4, the illuminance calibration method of the illuminance calibration device 1 includes the following steps:

Step S41: detecting the current illuminance of a target position.

Step S42: transmitting a test signal to a lighting device to adjust the brightness of the lighting device by the minimal brightness adjusting unit of the lighting device so as to obtain the adjusted current illuminance of the target position.

Step S43: generating a brightness adjusting signal according to the current illuminance, the adjusted current illuminance, the minimal brightness adjusting unit and a target illuminance.

Step S44: adjusting the brightness of the lighting device by the brightness adjusting signal in order to make the illuminance of the target position reach the target illuminance.

The embodiment just exemplifies the present invention and is not intended to limit the scope of the present invention; any equivalent modification and variation according to the spirit of the present invention is to be also included within the scope of the following claims and their equivalents.

Although the operations of the method (s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is worthy to point out that most of the currently available lighting devices can only adjust the brightness of the light sources thereof, but there is no method capable of directly adjusting the illuminance of a target position. Accordingly, the currently available lighting devices cannot satisfy the actual requirements and cannot provide great user experience. Besides, the power consumption of the currently available lighting devices cannot be effectively decreased, so cannot be energy-saving. On the contrary, according to one embodiment of the present invention, the illuminance calibration device includes a processing module and a light detecting module. The processing module performs an illuminance calibration process. The processing module performs an illuminance calibration process. The light detecting module detects the current illuminance of a target position and transmits the current illuminance to the processing module. When the processing module is executing the illuminance calibration process, the processing module transmits a test signal to the lighting device in order to adjust the brightness of the lighting device by the minimal brightness adjusting unit of the lighting device and obtain the adjusted current illuminance of the target position. Afterward, the processing module can generate a brightness adjusting signal according to the current illuminance, the adjusted current illuminance, the minimal brightness adjusting unit and a target illuminance so as to adjust the brightness of the lighting device, such that the illuminance of the lighting device can reach the target illuminance. The above illuminance calibration process can be directly used to adjust the illuminance of a specific position. Therefore, the illuminance calibration device can conform to actual requirements and provide greater user experience.

Also, according to one embodiment of the present invention, the illuminance calibration device has a specially-designed illuminance calibration process and this illuminance calibration process can be easily realized by executing an application via the processing module of the illuminance calibration device without additional calibration instruments. Accordingly, the cost of realizing the illuminance calibration function can be reduced, so the illuminance calibration device can be more comprehensive in application.

Further, according to one embodiment of the present invention, the illuminance calibration device has the specially-designed illuminance calibration process, which can effectively calculate a brightness-illuminance relation parameter with a view to precisely obtaining the relation between the brightness of the lighting device and the illuminance of the target position. Th above mechanism can greatly simplify the illuminance calibration process and can achieve precise illuminance calibration result. Thus, the brightness adjustment of the lighting deice can be more accurate so as to reduce the power consumption of the lighting device, such that the lighting device can save more energy. In this way, the illuminance calibration device can satisfy actual requirements and meet the future development trend.

Moreover, according to one embodiment of the present invention, the function of the illuminance calibration device can perform the illuminance calibration process by integrating a mobile device and the application corresponding thereto. The mobile device may be a smart phone, a smart watch, a tablet computer, a laptop computer or other similar devices. Therefore, the illuminance calibration device can be more convenient and flexible in use.

Furthermore, according to one embodiment of the present invention, the design of the illuminance calibration device is simple, so the illuminance calibration device can achieve great technical effects without significantly increasing the cost thereof. As a result, the illuminance calibration device can have high commercial value. As set forth above, the illuminance calibration device according to the embodiments can definitely achieve great technical effects.

Figure 5:
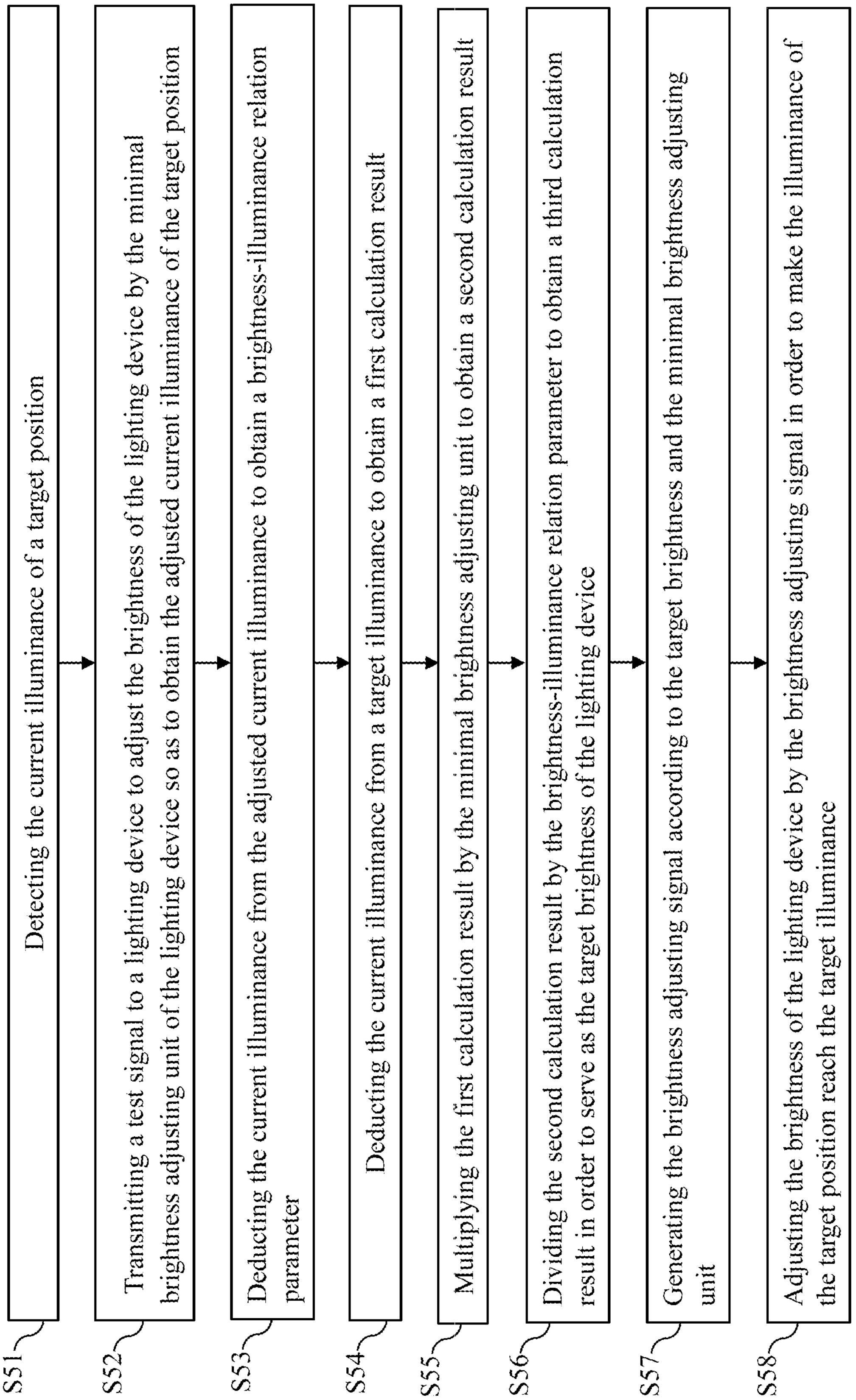
FIG. 5 is a flow diagram of an illuminance calibration method in accordance with another embodiment of the present invention.

Please refer to FIG. 5, which is a flow diagram of an illuminance calibration method in accordance with another embodiment of the present invention. As shown in FIG. 5, the illuminance calibration method of the illuminance calibration device 1 includes the following steps:

Step S51: detecting the current illuminance of a target position.

Step S52: transmitting a test signal to a lighting device to adjust the brightness of the lighting device by the minimal brightness adjusting unit of the lighting device so as to obtain the adjusted current illuminance of the target position.

Step S53: deducting the current illuminance from the adjusted current illuminance to obtain a brightness-illuminance relation parameter.

Step S54: deducting the current illuminance from a target illuminance to obtain a first calculation result.

Step S55: multiplying the first calculation result by the minimal brightness adjusting unit to obtain a second calculation result.

Step S56: dividing the second calculation result by the brightness-illuminance relation parameter to obtain a third calculation result in order to serve as the target brightness of the lighting device.

Step S57: generating the brightness adjusting signal according to the target brightness and the minimal brightness adjusting unit.

Step S58: adjusting the brightness of the lighting device by the brightness adjusting signal in order to make the illuminance of the target position reach the target illuminance.

The embodiment just exemplifies the present invention and is not intended to limit the scope of the present invention; any equivalent modification and variation according to the spirit of the present invention is to be also included within the scope of the following claims and their equivalents.

Although the operations of the method (s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

To sum up, according to one embodiment of the present invention, the illuminance calibration device includes a processing module and a light detecting module. The processing module performs an illuminance calibration process. The processing module performs an illuminance calibration process. The light detecting module detects the current illuminance of a target position and transmits the current illuminance to the processing module. When the processing module is executing the illuminance calibration process, the processing module transmits a test signal to the lighting device in order to adjust the brightness of the lighting device by the minimal brightness adjusting unit of the lighting device and obtain the adjusted current illuminance of the target position. Afterward, the processing module can generate a brightness adjusting signal according to the current illuminance, the adjusted current illuminance, the minimal brightness adjusting unit and a target illuminance so as to adjust the brightness of the lighting device, such that the illuminance of the lighting device can reach the target illuminance. The above illuminance calibration process can be directly used to adjust the illuminance of a specific position. Therefore, the illuminance calibration device can conform to actual requirements and provide greater user experience.

Also, according to one embodiment of the present invention, the illuminance calibration device has a specially-designed illuminance calibration process and this illuminance calibration process can be easily realized by executing an application via the processing module of the illuminance calibration device without additional calibration instruments. Accordingly, the cost of realizing the illuminance calibration function can be reduced, so the illuminance calibration device can be more comprehensive in application.

Further, according to one embodiment of the present invention, the illuminance calibration device has the specially-designed illuminance calibration process, which can effectively calculate a brightness-illuminance relation parameter with a view to precisely obtaining the relation between the brightness of the lighting device and the illuminance of the target position. Th above mechanism can greatly simplify the illuminance calibration process and can achieve precise illuminance calibration result. Thus, the brightness adjustment of the lighting deice can be more accurate so as to reduce the power consumption of the lighting device, such that the lighting device can save more energy. In this way, the illuminance calibration device can satisfy actual requirements and meet the future development trend.

Moreover, according to one embodiment of the present invention, the function of the illuminance calibration device can perform the illuminance calibration process by integrating a mobile device and the application corresponding thereto. The mobile device may be a smart phone, a smart watch, a tablet computer, a laptop computer or other similar devices. Therefore, the illuminance calibration device can be more convenient and flexible in use.

Furthermore, according to one embodiment of the present invention, the design of the illuminance calibration device is simple, so the illuminance calibration device can achieve great technical effects without significantly increasing the cost thereof. As a result, the illuminance calibration device can have high commercial value.

It should also be noted that at least some of the operations for the methods described herein may be implemented using software instructions stored on a computer useable storage medium for execution by a computer (or a processor). As an example, an embodiment of a computer program product includes a computer useable storage medium to store a computer readable program.

The computer useable or computer readable storage medium can be an electronic, magnetic, optical, electromagnetic, infrared, or semiconductor system (or apparatus or device). Examples of non-transitory computer useable and computer readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention (or each module of the system) may be implemented entirely in hardware, entirely in software or in an implementation containing both hardware and software elements. In embodiments which use software, the software may include, but not limited to, firmware, resident software, microcode, etc. In embodiments which use hardware, the hardware may be implemented within one or more application specific integrated circuits (ASICs), digital signal processors (DSPs), digital signal processing devices (DSPDs), programmable logic devices (PLDs), field programmable gate arrays (FPGAs), central-processing unit (CPU), controllers, microcontrollers, microprocessors, electronic devices, other electronic units designed to perform the functions described herein, or a combination thereof.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illuminance calibration method, comprising:

detecting a current illuminance of a target position by a light detecting module;

receiving the current illuminance by a processing module;

transmitting a test signal to a lighting device to adjust a brightness of the lighting device by a minimal brightness adjusting unit of the lighting device by the processing module so as to obtain an adjusted current illuminance of the target position;

deducting the current illuminance from the adjusted current illuminance by the processing module to obtain a brightness-illuminance relation parameter;

deducting the current illuminance from a target illuminance by the processing module to obtain a first calculation result;

multiplying the first calculation result by the minimal brightness adjusting unit by the processing module to obtain a second calculation result;

dividing the second calculation result by the brightness-illuminance relation parameter by the processing module to obtain a third calculation result in order to serve as a target brightness of the lighting device;

generating a brightness adjusting signal according to the target brightness and the minimal brightness adjusting unit by the processing module; and adjusting the brightness of the lighting device according to the brightness adjusting signal by the processing module in order to make an illuminance of the target position reaches the target illuminance.

* * * * *